US009479957B2

(12) United States Patent
Lee et al.

(10) Patent No.: US 9,479,957 B2
(45) Date of Patent: Oct. 25, 2016

(54) METHOD FOR REPORTING BUFFER STATUS FOR DEVICE-TO-DEVICE COMMUNICATION AND APPARATUS THEREFOR

(71) Applicant: LG ELECTRONICS INC., Seoul (KR)

(72) Inventors: Eunjong Lee, Anyang-si (KR); Hyeyoung Choi, Anyang-si (KR); Heejeong Cho, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 14/408,878

(22) PCT Filed: Feb. 7, 2013

(86) PCT No.: PCT/KR2013/001004
§ 371 (c)(1),
(2) Date: Dec. 17, 2014

(87) PCT Pub. No.: WO2013/191353
PCT Pub. Date: Dec. 27, 2013

(65) Prior Publication Data
US 2015/0163689 A1      Jun. 11, 2015

Related U.S. Application Data

(60) Provisional application No. 61/660,792, filed on Jun. 17, 2012.

(51) Int. Cl.
*H04B 7/00* (2006.01)
*H04W 24/10* (2009.01)
(Continued)

(52) U.S. Cl.
CPC ........... *H04W 24/10* (2013.01); *H04W 76/023* (2013.01); *H04W 80/02* (2013.01)

(58) Field of Classification Search
CPC .... H04W 40/24; H04W 40/32; H04W 48/16
USPC ................ 370/310, 328, 329, 431, 464, 474
See application file for complete search history.

(56) References Cited

U.S. PATENT DOCUMENTS 8,526,442 B2 *  9/2013  Li ..................... H04W 72/1242
                                              370/395.3
8,705,398 B2 *  4/2014  Koskela ........... H04W 72/1284
                                              370/231

(Continued)

FOREIGN PATENT DOCUMENTS

WO     2010/082084     7/2010
WO     2010/097645     9/2010

(Continued)

OTHER PUBLICATIONS

PCT International Application No. PCT/KR2013/001004, Written Opinion of the International Searching Authority dated May 2013, 17 pages.

*Primary Examiner* — Dmitry H Levitan
(74) *Attorney, Agent, or Firm* — Lee, Hong, Degerman, Kang & Walmey; Jonathan Kang; Michael Monaco

(57) ABSTRACT

Disclosed are a method for reporting buffer status for device-to-device (D2D) communication and an apparatus therefor. The method for reporting buffer status in a radio communication system that supports D2D communication comprises: setting up, by a first D2D terminal, a media access control (MAC) packet data unit (PDU) including an ID for a D2D link with a second D2D terminal, in order for D2D buffer status reporting (BSR), if the first D2D terminal is supposed to transmit data to the second D2D terminal; and transmitting the MAC PDU from the first D2D terminal to a network.

12 Claims, 21 Drawing Sheets

(51) Int. Cl.
*H04W 76/02* (2009.01)
*H04W 80/02* (2009.01)

(56) References Cited

U.S. PATENT DOCUMENTS

| | | | |
|---|---|---|---|
| 8,761,099 B2* | 6/2014 | Charbit | H04W 72/04 370/329 |
| 8,787,290 B2* | 7/2014 | Dai | H04W 72/1284 370/329 |
| 8,811,322 B2* | 8/2014 | Feuersanger | H04L 5/0007 370/329 |
| 9,055,585 B2* | 6/2015 | Lohr | H04L 1/0026 |
| 2012/0020213 A1 | 1/2012 | Horneman et al. | |
| 2015/0071212 A1* | 3/2015 | Kim | H04W 72/042 370/329 |
| 2015/0146633 A1* | 5/2015 | Kalhan | H04L 1/1607 370/329 |

FOREIGN PATENT DOCUMENTS

| | | |
|---|---|---|
| WO | 2010/119330 | 10/2010 |
| WO | 2012/046173 | 4/2012 |

* cited by examiner

R/R/E/LCID/F/L sub-header with
7-bits L field

R/R/E/LCID/F/L sub-header with
15-bits L field

R/R/E/LCIDsub-header

FIG. 11

| Buffer Size #0 | Buffer Size #1 | Oct 1 |
| Buffer Size #1 | Buffer Size #2 | Oct 2 |
| Buffer Size #2 | Buffer Size #3 | Oct 3 |

FIG. 12

| D2D link ID | E | |
|---|---|---|
| Buffer Size | | |

FIG. 13

| D2D link ID | Buffer Size |

D2D link ID (a)

(b)

(c)

METHOD FOR REPORTING BUFFER STATUS FOR DEVICE-TO-DEVICE COMMUNICATION AND APPARATUS THEREFOR

CROSS-REFERENCE TO RELATED APPLICATIONS

This application is the National Stage filing under 35 U.S.C. 371 of International Application No. PCT/KR2013/001004, filed on Feb. 7, 2013, which claims the benefit of U.S. Provisional Application Ser. No. 61/660,792, filed on Jun. 17, 2012, the contents of which are all hereby incorporated by reference herein in their entirety.

TECHNICAL FIELD

The present invention relates to wireless communication and, more specifically, to a method for reporting a buffer status in device-to-device communication and an apparatus therefor.

BACKGROUND ART

Recent propagation of smartphones and tablet PCs and introduction of large-capacity multimedia communication have caused an abrupt increase in mobile traffic. Mobile traffic is expected to double every year. Since mobile traffic is mostly transmitted through a base station, telecommunication carriers are facing a serious network load problem. To solve the problem, telecommunication carriers enlarge network equipment in order to handle increasing traffic and rapidly commercialize next-generation mobile communication standards capable of efficiently processing a large amount of traffic, such as mobile WiMAX and LTE (Long Term Evolution). However, to handle traffic which will rapidly increase, other solutions are needed.

Device-to-device (D2D) communication is a distributed communication method for directly transmitting traffic between neighboring nodes without using infrastructure such as base stations. In a D2D communication environment, each node such as a terminal discovers a physically neighboring terminal, establishes a communication session and then transmits traffic. Since D2D communication can solve the traffic overload by distributing traffic concentrated on the base station, D2D is spotlighted as element technology of next-generation mobile communication technology following 4G. For this reason, standard groups such as 3GPP and IEEE promote establishment of D2D communication standards based on LTE-A or Wi-Fi and Qualcomm is developing its own D2D communication technology.

To efficiently use radio resources in an LTE system, a base station needs to recognize a degree to which a terminal wants to transmit data. In the case of uplink, particularly, the amount of data to be transmitted from the terminal needs to be reported to the base station. If the amount of data to be transmitted from the terminal is not reported to the base station, then the base station cannot determine the amount of radio resources to be allocated to the terminal, leading to inefficient radio resource allocation.

To solve this problem, a terminal that intends to transmit data through uplink can report the amount of data to be transmitted on uplink through a buffer status report (BSR). The base station can determine the amount of radio resources to be allocated to the terminal on the basis of the buffer status report received from the terminal.

In D2D communication, a target to which a buffer status of a transmitting terminal is reported is not fixed since D2D communication is communication between terminals rather than communication between a terminal and a base station, distinguished from LTE. Therefore, a buffer status reporting method has not been discussed for D2D communication.

Accordingly, D2D communication still has a problem of inefficient radio resource allocation between a transmitting terminal and a receiving terminal and a problem that the receiving terminal needs to continuously monitor allocated radio resources even after completion of data transmission since the receiving terminal cannot recognize the end time of data transmission from the transmitting terminal

DISCLOSURE

Technical Problem

An object of the present invention is to provide a method for reporting, by a D2D terminal, a buffer status to a network or a target D2D terminal in a wireless communication system supporting D2D communication.

Another object of the present invention is to provide a method for reporting a buffer status indicating that a buffer of a D2D terminal is empty to a network or a target D2D terminal when the buffer status of the D2D terminal is empty in a wireless communication system supporting D2D communication.

The technical problems solved by the present invention are not limited to the above technical problems and those skilled in the art may understand other technical problems from the following description.

Technical Solution

To accomplish the object of the present invention, there is provided a method for reporting a buffer status in a radio communication system supporting device-to-device (D2D) communication, comprising: configuring, by a first D2D terminal, a media access control (MAC) packet data unit (PDU) including an ID of a D2D link with a second D2D terminal, for D2D buffer status reporting (BSR), when the first D2D terminal is supposed to transmit data to the second D2D terminal; and transmitting the MAC PDU from the first D2D terminal to a network.

Here, the ID of the D2D link may serve to distinguish the D2D link between the first D2D terminal and the second D2D terminal from other D2D links. The MAC PDU may include i) MAC control elements including a buffer size indicating the quantity of data to be transmitted to the second D2D terminal and the D2D link ID and ii) sub-headers corresponding to the MAC control elements. The sub-headers may include a logical channel identification field (LCID), and the first D2D terminal may set an index indicating the D2D BSR for D2D communication as a field value of the LCID. The D2D link ID may be a physical link ID designated by the network or a logical link ID reset by the first D2D terminal. The logical link ID may be one of logical link IDs acquired by i) sequentially numbering physical link IDs around the first D2D terminal in ascending or descending order or ii) newly numbering the physical link IDs in physical link ID generation order or a reverse thereof. The first D2D terminal may control the MAC control element in which the buffer size is set to "0" to be included in the MAC PDU when a buffer of the first D2D terminal is empty. The first D2D terminal having the empty buffer status may be instructed by the network to perform at least one of i)

entering a D2D sleep mode and ii) releasing connection with the second D2D terminal. When the buffer of the first D2D terminal is empty, the first D2D terminal may configure a MAC PDU including the D2D link ID such that a D2D empty buffer report (BR) is transmitted instead of the D2D BSR. The MAC PDU for the D2D empty BR may include i) MAC control elements including the D2D link ID and ii) sub-headers corresponding to the MAC control elements.

To accomplish the other object of the present invention, there is provided a D2D terminal transmitting a BSR in a radio communication system supporting D2D communication, comprising: a processor configured to configure a MAC PDU including an ID of a D2D link with a first D2D terminal, for D2D buffer status reporting, when the D2D terminal is supposed to transmit data to the first D2D terminal; and a transmitter configured to transmit the MAC PDU to a network. Here, the ID of the D2D link may serve to distinguish the D2D link between the D2D terminal and the first D2D terminal from other D2D links.

Advantageous Effects

According to embodiments of the present invention, a network can efficiently allocate radio resources to a D2D link.

According to embodiments of the present invention, a receiving D2D terminal can recognize completion of data transmission from a transmitting D2D terminal and skip monitoring of a resource region in which data is not transmitted, thereby improving power efficiency.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIGS. 10 and 11 illustrate MAC control element formats for buffer status report;

FIGS. 12 and 13 illustrate MAC control element formats for D2D buffer status report;

FIGS. 16 and 17 illustrate MAC control element formats for a D2D empty BR;

BEST MODE

Figure 1:
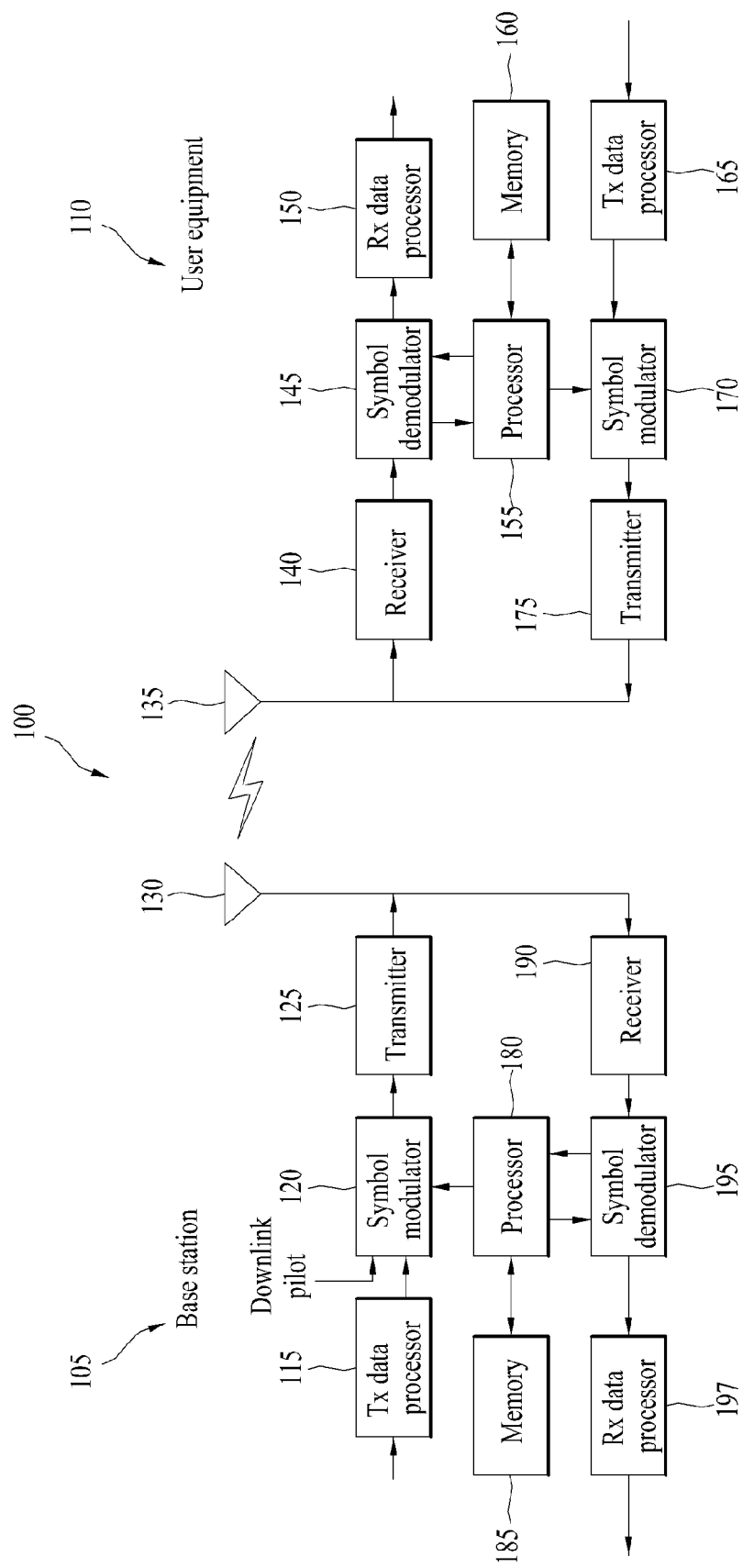
FIG. 1 is a block diagram illustrating configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE/LTE-A system, the following descriptions are applicable to other random mobile communication systems in a manner of excluding unique features of the 3GPP LTE/LTE-A.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16 system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11

(Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received (Rx) data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received (Rx) data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and an base station may be classified into first layer L1, second layer L2 and third layer L3 based on 3 lower layers of OSI (open system interconnection) model well known to communication systems. A physical layer belongs to the first layer and provides an information transfer service via a physical channel. RRC (radio resource control) layer belongs to the third layer and provides control radio resourced between UE and network. A user equipment and a base station may be able to exchange RRC messages with each other via radio communication layer and RRC layers.

In the present specification, the processor 155 of the user equipment 110 performs operations of processing signals and data except a signal transceiving function of the user equipment 110 and a storing function of the user equipment 110. And, the processor 180 of the base station 105 performs operations of processing signals and data except a signal transceiving function of the user equipment 110 and a storing function of the user equipment 110. Yet, for clarity of the following description, the processors 155 and 180 shall not be mentioned overall. Although the processor 155/180 is not mentioned specially, the processor 155/180 can be regarded as performing a series of operations including data processing and the like except a signal transceiving function and a storing function.

A description will be given of various embodiments in which a terminal performs device-to-device direct communication (referred to as D2D communication or D2D direct communication hereinafter). While 3GPP LTE/LTE-A is exemplified for detailed description of D2D communication, D2D communication may be applied to other communication systems (IEEE 802.16, WiMAX, etc.).

In the specification, a terminal capable of performing D2D communication is referred to as a D2D terminal for convenience of description. When a transmitting end and a receiving end need to be discriminated from each other, a D2D terminal that transmits or attempts to transmit data to another D2D terminal using radio resources assigned to a D2D link in D2D communication is called a transmitting D2D terminal and a terminal that receives or attempts to receive data from the transmitting D2D terminal is called a receiving D2D terminal. When there is a plurality of receiving D2D terminals that receive or attempt to receive data from the transmitting D2D terminal, the receiving D2D terminals may be identified using the ordinals "first to N-th". Furthermore, an arbitrary node of a network, such as a base station for controlling connection between D2D terminals or allocating radio resources to D2D links, a D2D server and an access/session management server, is referred to as "network" for convenience of description.

Figure 2:
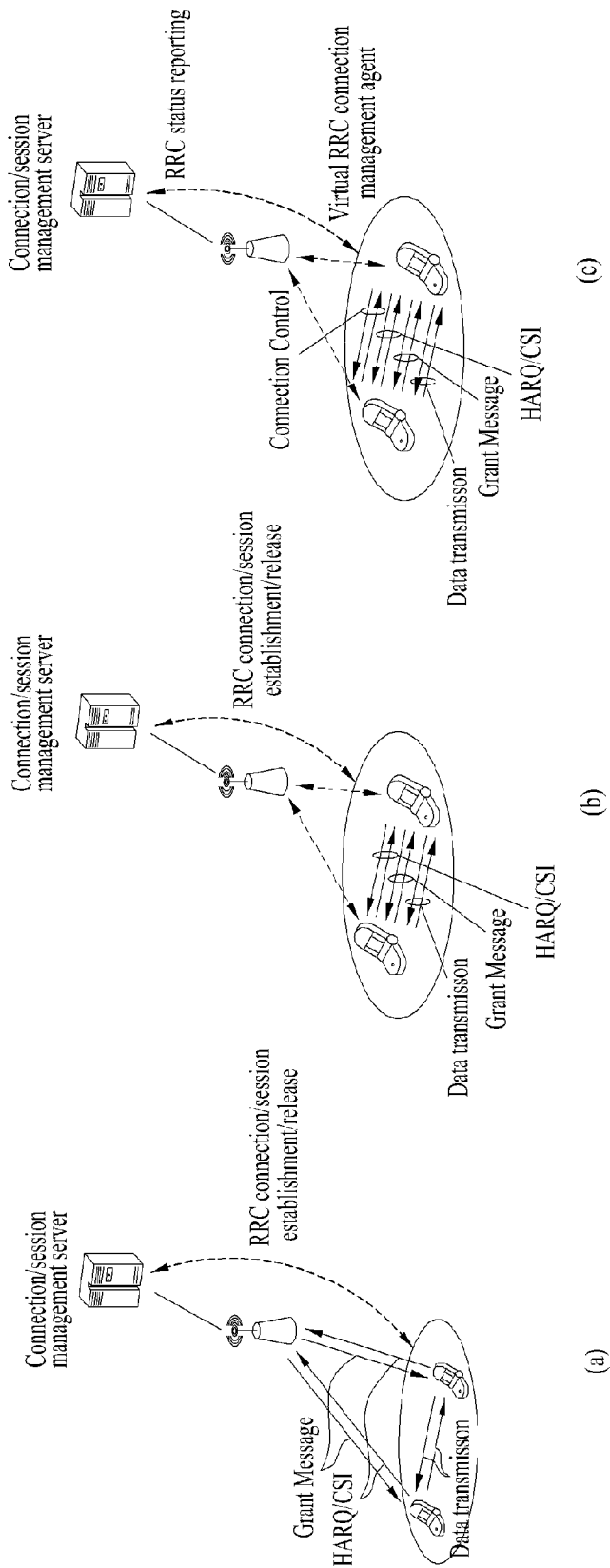
FIG. 2 illustrates various embodiments of D2D communication.

FIG. 2 illustrates various embodiments of D2D communication.

D2D communication can be divided into network coordinated D2D communication and autonomous D2D communication according to whether D2D communication is performed through network control. Network coordinated D2D communication can be sub-divided into "data only in D2D" in which only data is transmitted through D2D and "connection control only in network" in which a network performs connection control only, according to a degree to which the network participates in communication. In the following, "data only in D2D" is called "network centralized D2D communication" and "connection control only in network" is called "distributed D2D communication" for convenience of description.

FIGS. 2a and 2b respectively illustrate network centralized D2D communication and distributed D2D communication.

In network centralized D2D communication shown in FIG. 2a, only data is exchanged between D2D terminals and connection control and radio resource allocation (grant message) between the D2D terminals are performed by the network. The D2D terminals can transmit and receive data or specific control information using radio resources allocated by the network.

For example, HARQ ACK/NACK feedback for data reception or channel state information (CSI) between the D2D terminals can be transmitted to another D2D terminal through the network instead of being directly exchanged between the D2D terminals.

Specifically, when the network establishes a D2D link between the D2D terminals and allocates radio resources to the established D2D link, a transmitting D2D terminal and a receiving D2D terminal can perform D2D communication using the allocated radio resources.

In establishment of the D2D link between D2D terminals, a base station may assign a physical D2D link ID (LID) to the established D2D link. The physical D2D LID may be used as an identifier for identifying a corresponding D2D link when a plurality of D2D links is present among a plurality of D2D terminals.

Figure 3:
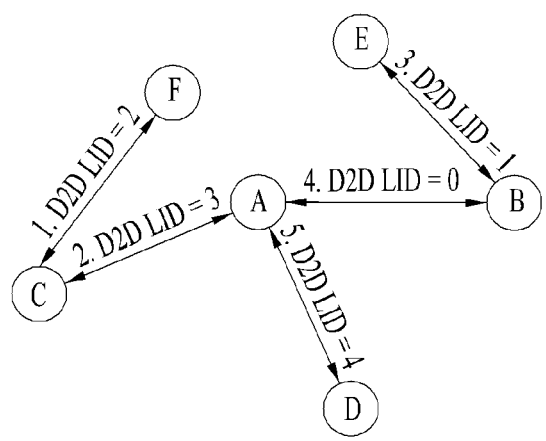
FIG. 3 illustrates allocation of different physical D2D link IDs to a plurality of D2D links.

FIG. 3 illustrates allocation of different physical D2D LIDs to a plurality of D2D links. As shown in FIG. 3, when a plurality of D2D terminals attempts to perform D2D communication, a base station may assign different physical D2D LIDs to D2D links between D2D terminals. For example, when D2D terminal A establishes D2D links with D2D terminal B, D2D terminal C and D2D terminal D, the D2D links can be identified by different physical LIDs (physical D2D LIDs 0, 3 and 4 in FIG. 3).

After establishment of the D2D link between the D2D terminals, the network may allocate radio resources. For example, the network can allocate the radio resources on the basis of a degree of interference between D2D links and information on strengths of signals received from the D2D terminals. Accordingly, the D2D terminals can perform D2D communication using the radio resources allocated by the network.

That is, in network centralized D2D communication, D2D communication between D2D terminals is controlled by the network and the D2D terminals can perform D2D communication using radio resources allocated by the network.

A network in distributed D2D communication illustrated in FIG. 2b performs limited operations, compared to the network in network centralized D2D communication. In distributed D2D communication, although the network controls connection between D2D terminals, radio resources (grant message) between the D2D terminals can be occupied by the D2D terminals through competition without the aid of the network.

For example, HARQ ACK/NACK for data reception or CSI between D2D terminals can be directly exchanged between the D2D terminals without passing through the network.

As described above, D2D communication can be classified into network centralized D2D communication and distributed D2D communication according to a degree of participation of the network in D2D communication. Here, a common characteristic of network centralized D2D communication and distributed D2D communication is that D2D connection control can be performed by the network.

Specifically, the network in network coordinated D2D communication can set connection between D2D terminals that attempt to perform D2D communication by establishing a D2D link between the D2D terminals. When the D2D link is established between the D2D terminals, the network can assign a physical D2D LID to the established D2D link. The physical D2D LID can be used as an identifier for identifying a corresponding D2D link when a plurality of D2D links is present among a plurality of D2D terminals.

FIG. 3 illustrates allocation of different physical D2D LIDs to a plurality of D2D links. As shown in FIG. 3, when a plurality of D2D terminals attempts to perform D2D communication, a base station may assign different physical D2D LIDs to D2D links between D2D terminals. For example, when D2D terminal A establishes D2D links with D2D terminal B, D2D terminal C and D2D terminal D, the D2D links can be identified by different physical LIDs (physical D2D LIDs 0, 3 and 4 in FIG. 3).

After establishment of the D2D link between the D2D terminals, the D2D terminals can perform D2D communication using radio resources allocated to the D2D link by the network or radio resources acquired through competition with other D2D terminals.

FIG. 2c illustrates autonomous D2D communication. According to autonomous D2D communication, D2D terminals can freely perform D2D communication without the aid of the network, distinguished from network centralized D2D communication and distributed D2D communication. That is, in autonomous D2D communication, D2D terminals can autonomously perform connection control and radio resource occupation, differently from network centralized D2D communication and distributed D2D communication. The network may provide information on D2D channels that can be used in the corresponding cell to the D2D terminals as necessary.

Autonomous D2D communication will now be described in more detail on the basis of a frame structure which will be described below.

Figure 4:
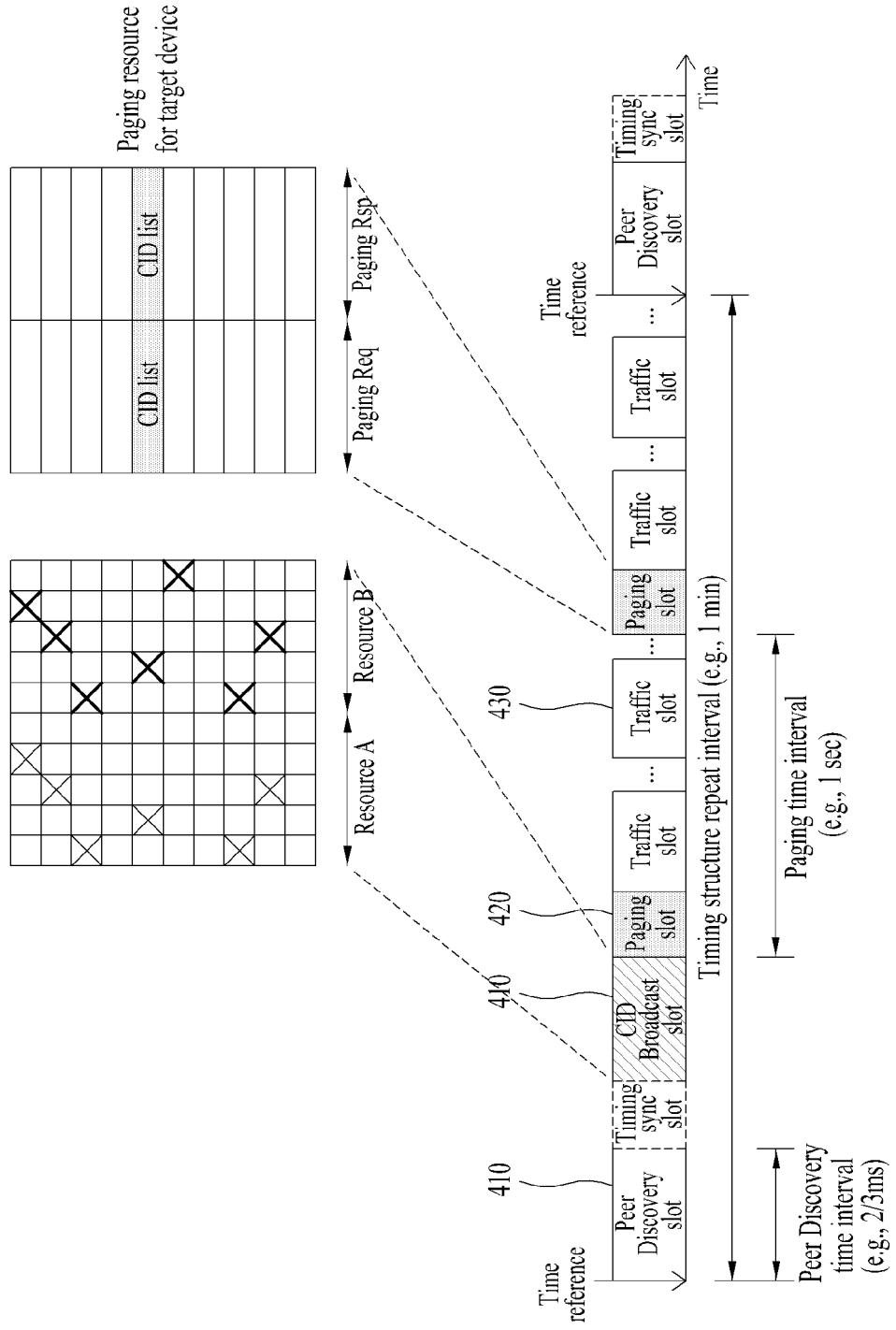
FIG. 4 illustrates an exemplary frame structure applicable to autonomous D2D communication.

FIG. 4 illustrates a frame structure applicable to autonomous D2D communication. That is, D2D terminals can perform D2D communication using the frame shown in FIG. 4 in autonomous D2D communication.

As shown in FIG. 4, the frame applicable to autonomous D2D communication may include a peer discovery slot 410, a paging slot 420 and a traffic slot 430. The frame applicable to autonomous D2D communication may further include a connection identification (CID) broadcast slot 440 as necessary.

The peer discovery slot 410 is used for a D2D terminal to discover a neighboring D2D terminal and to broadcast presence of the D2D terminal to the neighboring D2D terminal One peer discovery slot 410 includes a plurality of logical channels. A D2D terminal may share the peer discovery slot 410 with another D2D terminal through broadcasting and listening. That is, the D2D terminal can recognize a logical channel that is being used and an empty logical channel, from among a plurality of logical channels of the peer discovery slot 410, by listening to a logical channel occupied by the other D2D terminal from the other D2D terminal.

The broadcast listening range of a D2D terminal may be limited to neighboring D2D terminals within 1 hop from the D2D terminal as necessary. However, the broadcast listening range of a D2D terminal is not necessarily limited to neighboring D2D terminals within 1 hop.

Upon listening to the logical channel occupied by the other D2D terminal from the other D2D terminal, the D2D terminal may randomly select an empty logical channel of the first peer discovery slot 410. Then, the D2D terminal may broadcast a peer discovery signal for indicating the selected logical channel through the selected logical channel using the next peer discovery slot 410. Operation of the D2D terminal to broadcast the peer discovery signal will now be described in more detail with reference to FIG. 5.

Figure 5:
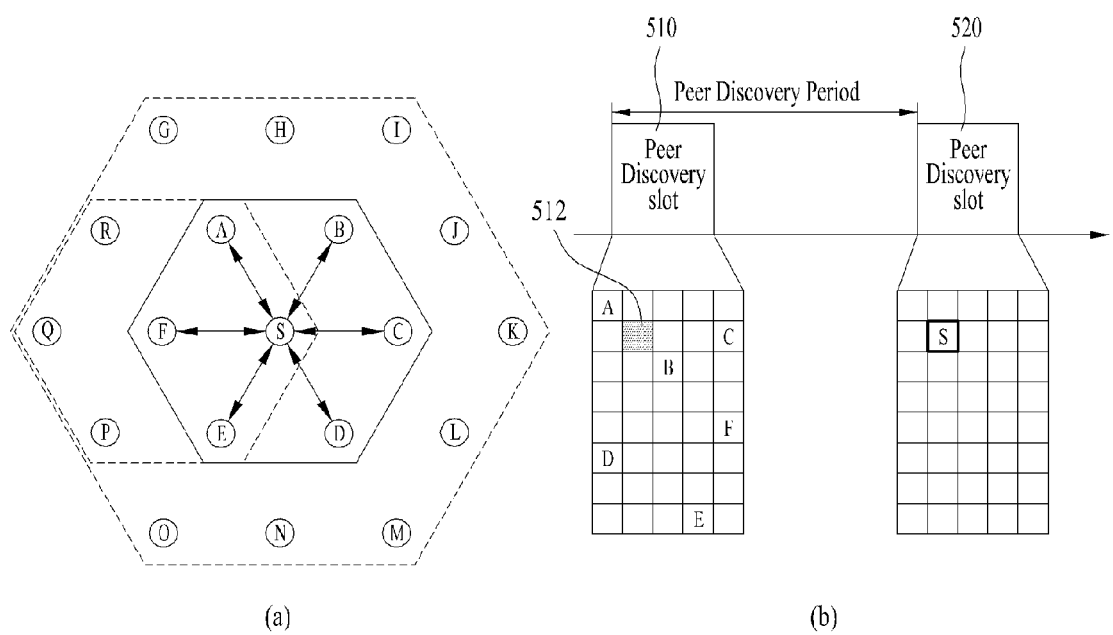
FIG. 5 illustrates a process through which a D2D terminal broadcasts a peer discovery signal.

FIG. 5 illustrates the peer discovery signal broadcasting operation of a D2D terminal. As shown in FIG. 5a, it is assumed that D2D terminals A to R are located around D2D terminal S, D2D terminals A to F are neighboring terminals within 1 hop from D2D terminal S, and D2D terminals G to R are neighboring terminals within 2 hops from D2D terminal S.

In the environment shown in FIG. 5a, when D2D terminal S can listen to broadcasts from neighboring terminals within 1 hop, D2D terminal S may listen to logical channels occupied by D2D terminals A to F for the first peer discovery slot 510. Upon listening to the logical channels occupied by D2D terminals A to F, D2D terminal S may select one of empty logical channels in the peer discovery slot (a logical channel 512 in FIG. 5b) on the basis of the listened broadcast. Subsequently, D2D terminal S may broadcast a peer discovery signal using the selected logical channel from the second peer discovery slot 520.

D2D terminals A to F listening to the logical channel selected by D2D terminal S may detect whether the logical channel selected by D2D terminal S collides with other logical channels. For example, D2D terminal F, which listens to broadcast from D2D terminals A, E, P and R, can detect whether the logical channel selected by D2D terminal S collides with the logical channel of D2D terminal Q. When the logical channel selected by D2D terminal S collides with the logical channel of D2D terminal Q, D2D terminal F may transmit a notification signal indicating collision of the logical channels and D2D terminal S may select a new logical channel according to the notification signal.

Conversely, when the logical channel selected by D2D terminal S does not collide with any logical channel, D2D terminal S may continuously broadcast the peer discovery signal through the selected logical channel.

Upon determining that the selected logical channel collides with a logical channel occupied by D2D terminal Q, D2D terminal F transmits a notification signal indicating detection of collision to D2D terminal S such that D2D terminals can select a new logical channel.

The CID broadcast slot 440 shown in FIG. 4 is used for the D2D terminal to listen to a CID that is being used by another D2D terminal and to broadcast a CID that is being used by the D2D terminal Specifically, the D2D terminal may broadcast a CID broadcast signal through CID resources of the CID broadcast slot 440 in order to indicate the CID that the D2D terminal uses or attempts to use. The D2D terminal may set the CID to be used through the paging slot 420 which will be described below.

The paging slot 420 shown in FIG. 4 is used to set a CID between a transmitting D2D terminal and a receiving D2D terminal. The paging slot 420 for setting a CID may include a paging request interval and a paging response interval. To set the CID between the transmitting D2D terminal and the receiving D2D terminal, one of the transmitting D2D terminal and the receiving D2D terminal may operate as a paging initiator terminal and the other may operate as a paging target terminal.

The paging initiator terminal may generate a first CID list including at least one empty broadcast resource (i.e. CID that is not used) on the basis of a CID heard through the CID broadcast slot 440. Upon generation of the first CID list, the paging initiator terminal may transmit the first CID list to the paging target terminal using paging resources thereof or paging resources of the paging target terminal.

Here, the paging resources may be determined by device IDs of the paging initiator terminal and the paging target terminal Paging resources between D2D terminals may be identified by time-frequency or an orthogonal code. However, identification of the paging resources is not limited thereto.

In the paging response interval, the paging target terminal may generate a second CID list including at least one empty broadcast resource on the basis of a CID heard through the CID broadcast slot 440 thereof and then transmit the second CID list to the paging initiator terminal using the paging resources thereof or the paging resources of the paging initiator terminal.

The paging initiator terminal and the paging target terminal may select available CID candidates on the basis of the first CID list and the second CID list, select one of the available CID candidates and broadcast a CID broadcast signal through CID resources of the CID broadcast slot 440 in order to signal the selected CID.

Subsequently, the paging initiator terminal and the paging target terminal may determine whether the selected CID is being used by another D2D terminal through the next CID broadcast slot 440. Specifically, the paging initiator terminal and the paging target terminal may determine whether the selected CID is being used by another D2D terminal by comparing signal strengths of different CID resources for the same tone.

Upon determining that the selected CID is being used by another D2D terminal, the paging initiator terminal and the paging target terminal may reselect a different CID. Conversely, upon determining that the selected CID is not used, the paging initiator terminal and the paging target terminal may activate the selected CID. Only when both the paging initiator terminal and the paging target terminal activate the selected CID, the selected CID can be set as the CID between the paging initiator terminal and the paging target terminal.

Distinguished from the aforementioned network centralized D2D communication and distributed D2D communication, a D2D terminal in autonomous D2D communication controls connection with another D2D terminal without establishment of a D2D link by the network. Accordingly, a D2D link ID cannot be assigned by the network in autonomous D2D communication. A D2D terminal in autonomous D2D communication can set a CID with another D2D terminal through the paging slot 420 rather than being assigned a D2D link ID to perform D2D communication.

Upon setting of the CID between the transmitting D2D terminal and the receiving D2D terminal through the paging slot 420, the transmitting D2D terminal and the receiving D2D terminal may perform data transmission and reception using the traffic slot 430. Here, the transmitting D2D terminal and the receiving D2D terminal may occupy the traffic slot 430 through competition with another D2D link. Upon occupation of the traffic slot 430, the transmitting D2D terminal and the receiving D2D terminal may transmit and receive data using the occupied traffic slot 430.

The process of occupying the traffic slot 430 by the transmitting D2D terminal and the receiving D2D terminal will now be described in detail with reference to FIG. 6.

Figure 6:
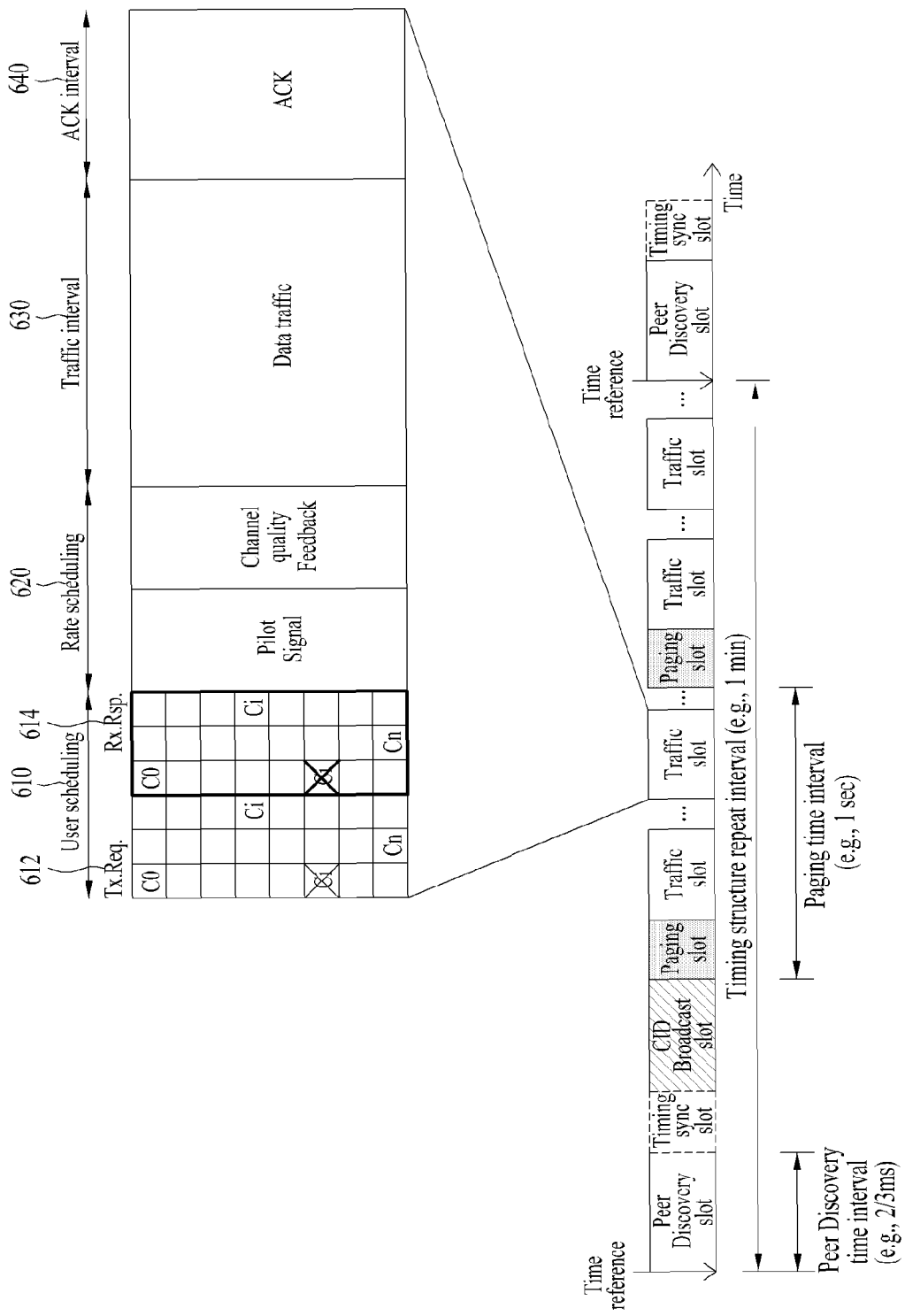
FIG. 6 illustrates a process through which a transmitting D2D terminal and a receiving D2D terminal occupy a traffic slot.

FIG. 6 illustrates the process of occupying the traffic slot by the transmitting D2D terminal and the receiving D2D terminal Referring to FIG. 6, the traffic slot 430 may include a user scheduling interval 610, a rate scheduling interval 620, a traffic interval 630 and an ACK interval 640.

The user scheduling interval 610 is used for the transmitting D2D terminal and the receiving D2D terminal to transmit and receive signals for occupying the traffic slot 430 and may include a request interval (Tx Req) 612 and a response interval (Rx Res) 614. The transmitting D2D terminal may transmit a request signal to the receiving D2D terminal through resources corresponding to the CID selected through the paging slot 620 using the CID in the request interval 612.

The receiving D2D terminal sharing the CID with the transmitting D2D terminal may receive the request signal and transmit a response signal to the transmitting D2D terminal through the resources corresponding to the CID in the response interval 614 upon determining that data transmission is possible according to a predetermined competition rule.

Upon successful reception of the request signal and the response signal, the transmitting D2D terminal and the receiving D2D terminal may determine that the traffic slot 430 is occupied thereby. Upon determining that the traffic slot 430 is occupied by the transmitting D2D terminal and the receiving D2D terminal, the transmitting D2D terminal may transmit a pilot signal (or a reference signal) to the receiving D2D terminal in the rate scheduling interval 620. Upon reception of the pilot signal from the transmitting D2D terminal, the receiving D2D terminal may check a channel state with respect to the pilot signal. That is, the receiving D2D terminal may check the channel state (CQI (Channel Quality Information), CSI (Channel State Information), SINR (Signal to Interference plus Noise to Ratio) and the like) through the pilot signal or reference signal transmitted from the transmitting D2D terminal and feed back the channel state to the transmitting D2D terminal.

Upon reception of feedback of the channel state from the receiving D2D terminal, the transmitting D2D terminal may determine whether to transmit data to the receiving D2D terminal using D2D traffic resources in the traffic interval 630. For example, when measured CQI and SINR are lower than or equal to predetermined threshold values, the transmitting D2D terminal may not transmit data in the traffic interval and may attempt to occupy the next traffic slot 430.

When the transmitting D2D terminal transmits data using the traffic resources in the traffic interval 630, the receiving D2D terminal may transmit ACK or NACK in the response interval 640 according to whether the data has been successfully received.

The present invention presents a method by which the transmitting D2D terminal provides a buffer status thereof to the network or the receiving D2D terminal in the aforementioned network centralized D2D communication, distributed D2D communication and autonomous D2D communication. A buffer status report (BSR) according to the present invention may be generated in the form of a MAC (Media Access Control) control element and included in a MAC PDU (Packet Data Unit). Prior to description of application of the BSR to the aforementioned three types of D2D transmission, the structure of the MAC PDU for the BSR will now be described in detail.

Figure 7:
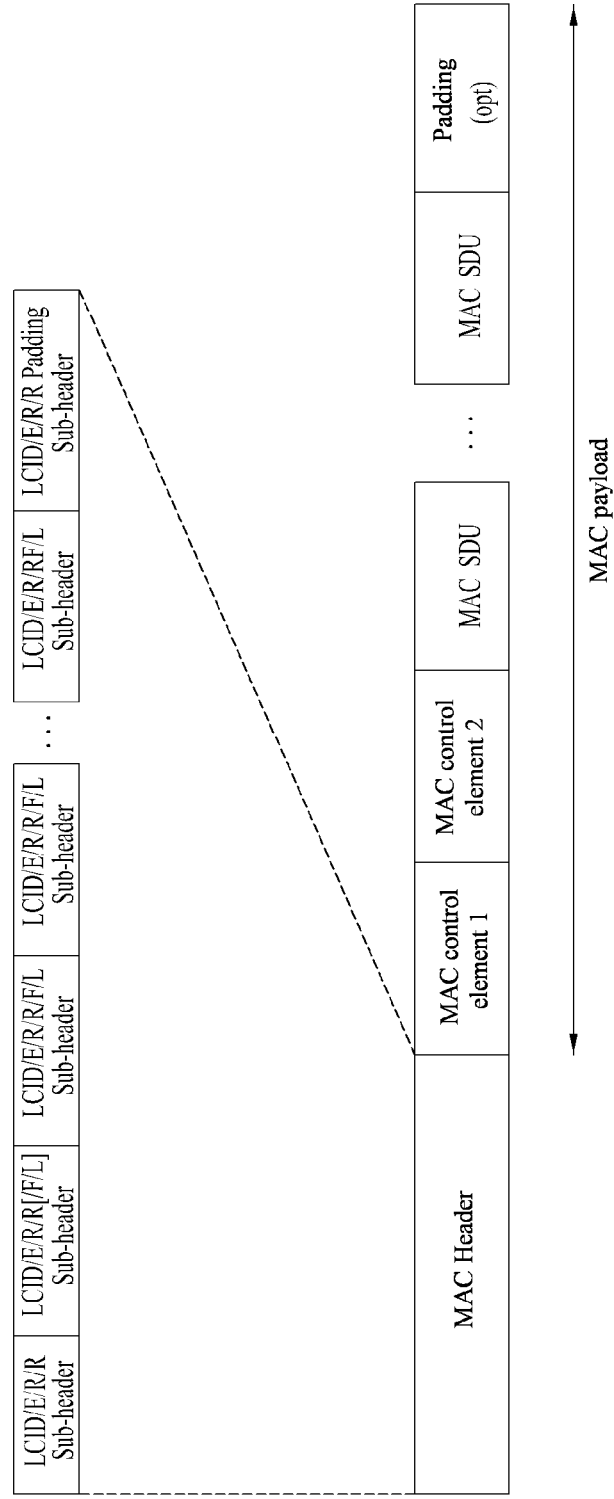
FIG. 7 illustrates a MAC PDU used in a MAC entity.

FIG. 7 illustrates a MAC PDU used in a MAC entity. As shown in FIG. 7, the MAC PDU includes a MAC header, at least one MAC SDU (Service Data Unit) and at least one MAC control element and may and may additionally include padding. At least one of the MAC SDU and the MAC control element may not be included in the MAC PDU as necessary.

As shown in FIG. 7, the MAC control element is normally disposed before the MAC SDU. The size of the MAC control element may be fixed or variable. When the size of the MAC control element is variable, it is possible to determine whether the size of the MAC control element is extended through an extended bit. The size of the MAC SDU may also be variable.

The MAC header may include at least one sub-header. Here, the at least one sub-header included in the MAC header corresponds to the MAC SDU, MAC control element and padding, and the order of sub-headers corresponds to the arrangement order of the corresponding elements. For example, when the MAC PDU includes MAC control element 1, MAC control element 2, a plurality of MAC SDUs and padding, as shown in FIG. 6, a sub-header corresponding to MAC control element 1, a sub-header corresponding to MAC control element 2, a plurality of sub-headers respectively corresponding to the plurality of MAC SDUs and a sub-header corresponding to the padding can be sequentially arranged in the MAC header.

Figure 8:
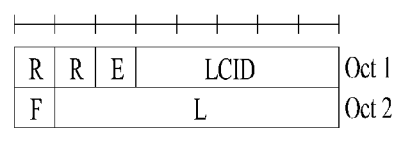
FIG. 8 illustrates a sub-header of the MAC PDU.
Figure 8:
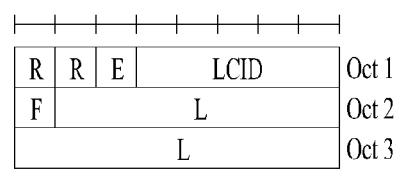

The sub-header included in the MAC header may include 6 header fields, as shown in FIG. 8. Specifically, the sub-header may include R/R/E/LCID/F/L header fields.

Figure 9:
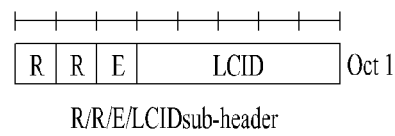
FIG. 9 illustrates a sub-header of the MAC PDU.

A sub-header including 4 header fields, as shown in FIG. 9, may be used as a sub-header corresponding to a MAC control element having a fixed size and a sub-header corresponding to the last one of data fields included in the MAC PDU. The 4 header fields may be R/R/E/LCID.

Fields shown in FIGS. 8 and 8 will now be described.

1) R: this represents a reserved bit which is not used.

2) E: this represents an extended bit which indicates whether an element corresponding to the sub-header is extended. For example, the element corresponding to the sub-header is ended without repetition when the E field is set to '0', whereas the element corresponding to the sub-header is repeated one more time and thus the length of the element is doubled when the E field is set to '1'.

3) LCID (Logical Channel Identification): this indicates which one of the MAC SDU, MAC control element and padding corresponds to the sub-header. If the sub-header is related to the MAC SDU, then LCID can indicate a logical channel corresponding to the MAC SDU. If the sub-header is related to MAC control elements, then LCID can indicate a MAC control element corresponding to the sub-header.

For example, indices applicable to LCID can be defined as shown in Tables 1 and 2.

TABLE 1

LCID values for DL-SCH

| Index | LCID value |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

TABLE 2

LCID values for UL-SCH

| Index | LCID value |
|---|---|
| 00000 | CCCH |
| 11110-01010 | Identity of the logical channel |
| 01011-11011 | Reserved |
| 11100 | UE Contention Resolution Deentity |

TABLE 2-continued

LCID values for UL-SCH

| Index | LCID value |
|---|---|
| 11101 | Timing Advance Command |
| 11110 | DRX Command |
| 11111 | Padding |

In LTE/LTE-A, a terminal may report a buffer status thereof to the network by setting an index of one of a truncated BSR, a short BSR and a long BSR to the LCID field. The relationship between the index and LCID value, shown in Tables 1 and 2, is exemplary for convenience of description and does not limit the present invention.

4) F: this indicates the length of the following L field.

5) L: this indicates the size of the MAC SDU or MAC control element corresponding to the sub-header. An L field of 7 bits can be used when the size of the MAC SDU or MAC control element corresponding to the sub-header is equal to or smaller than 127 bits and an L field of 15 bits can be used in other cases. When the size of the MAC control element is variable, the size of the MAC control element can be defined through L field. When the size of the MAC control element is fixed, the F field and L field can be omitted, as shown in FIG. 8, since the size of the MAC control element can be determined even if the size of the MAC control element is not defined through the L field.

Figure 10:

FIGS. 10 and 11 illustrate MAC control element formats for BSR. When a truncated BSR and a short BSR are defined in LCID field of the sub-header, the MAC control element corresponding to the sub-header may be configured to include one logical channel group ID (LCG ID) and one buffer size field indicating a buffer status of a logical channel group, as shown in FIG. 10. The LCG ID field is used to identify a logical channel whose buffer status needs to be reported and may have a length of 2 bits.

The buffer size field is used to indicate the quantity of available data of all logical channels belonging to the logical channel group after the MAC PDU is generated. The available data includes all data that can be transmitted in the RLC layer and PDCP layer, and the quantity of data may indicate bytes. In calculation of the quantity of data, the sizes of RLC header and MAC header can be excluded. The buffer size field may have a length of 6 bits.

When a long BSR is defined in the LCID field of the sub-header, the MAC control element corresponding to the sub-header may include 4 buffer size fields indicating buffers statuses of 4 groups respectively having LCG IDs of 0, 1, 2 and 3, as shown in FIG. 11. The buffer size fields can respectively indicate the total quantities of available data for different logical channel groups.

In general, a terminal can trigger a BSR process in at least one of the following cases.

1) Case in which data newly arrives at a buffer when all buffers have no data (regular BSR)

2) Case in which data arrives at an empty buffer and priority of a logical channel related to the buffer is higher than priority of a logical channel previously having data in the buffer 3) Case in which a configured MAC PDU has a remaining space 4) Case in which a predetermined time elapses from when the last BSR is transmitted 5) Case in which a retransmission timer expires 6) Case in which a cell is changed 7) Case in which there is no data to be transmitted A description will be given of a method for reporting a buffer status in D2D communication on the basis of the aforementioned MAC PDU for D2D communication types.

<BSR Method in Network Centralized D2D Communication>

In network centralized D2D communication, when a transmitting D2D terminal attempts to transmit data to a receiving D2D terminal, the transmitting D2D terminal may configure a MAC PDU for reporting the buffer status thereof to the network and report a D2D BSR by transmitting the MAC PDU to the network. Here, the D2D BSR may be reported to the network using a MAC control element of the MAC PDU. When the D2D BSR is reported using the MAC control element, the MAC PDU for the D2D BSR may include at least the MAC control element and a sub-headers corresponding thereto.

To indicate whether the D2D BSR is for data transmission between the transmitting D2D terminal and the network or for data transmission between the transmitting D2D terminal and the receiving D2D terminal, the transmitting D2D terminal may set an index indicating that the D2D BSR is for D2D communication to LCID of the sub-header. That is, the transmitting D2D terminal may define one of reserved indices as an index indicating a D2D BSR for D2D communication and set the index as a field value of LCID. Table 3 shows an example of defining one of reserved indices as an index indicating a D2D BSR for D2D communication.

TABLE 3

LCID values including D2D BSR

| Index | LCID value |
| --- | --- |
| 00000 | CCCH |
| 00001-01010 | Identity of the logical channel |
| 01011-11000 | Reserved |
| 11001 | D2D BSR |
| 11010 | Power Headroom Report |
| 11011 | C-RNTI |
| 11100 | Truncated BSR |
| 11101 | Short BSR |
| 11110 | Long BSR |
| 11111 | Padding |

In the example shown in Table 3, when the field value of LCID of the sub-header is "11001", the network can determine that the MAC control element corresponding to the sub-header indicates a D2D BSR for D2D communication. If the field value of LCID of the sub-header is one of "11100", "11101" and "11110", the network can determine that the MAC control element corresponding to the sub-header indicates a BSR for communication between the terminal and the base station.

In transmission of the D2D BSR to the network, the transmitting D2D terminal needs to provide, to the network, the basis on which a D2D terminal D2D-communicating with the transmitting D2D terminal using the D2D BSR can be determined. Accordingly, the transmitting D2D terminal may control the ID of the D2D link between the transmitting D2D terminal and the receiving D2D terminal to be included in the MAC control element when configuring the MAC control element for the D2D BSR. This will now be described with reference to FIGS. 12 and 13.

Figure 12:
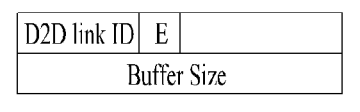

FIGS. 12 and 13 illustrate MAC control element formats for the D2D BSR. FIG. 12 shows a MAC control element having a variable size and FIG. 12 shows a MAC control element having a fixed size.

As shown in FIGS. 12 and 13, the transmitting D2D terminal may control the ID of the D2D link between the transmitting D2D terminal and the receiving D2D terminal to be included in the MAC control element. That is, the MAC control element for the truncated BSR and short BSR can include an LCG ID whereas the MAC control element for the D2D BSR can include a D2D LID for identifying the transmitting D2D terminal and the receiving D2D terminal Here, the D2D LID may be a physical link ID designated by the network or a logical link ID reset by a D2D terminal Logical link IDs may be obtained by arranging physical link IDs of neighboring D2D terminals around a D2D terminal in ascending or descending order and then sequentially numbering the arranged physical link IDs or by sequentially numbering the physical link IDs in physical link ID generation order. The logical link ID will now be described in detail with reference to FIG. 14.

Figure 14:
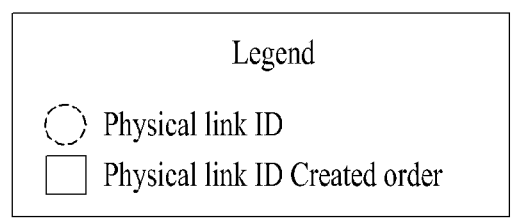
FIG. 14 illustrates a physical link ID and a logical link ID.
Figure 14:
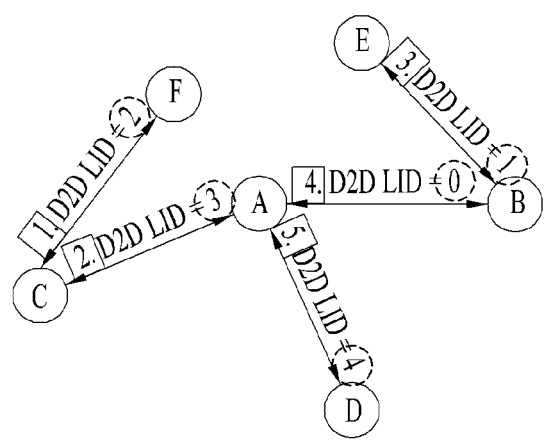

FIG. 14 is a view for explaining the physical link ID and the logical link ID. In the example of FIG. 14, an LID between D2D terminals may indicate a physical link ID allocated by the network and a number before the physical link ID may indicate the physical link ID generation sequence.

In the example of FIG. 14, a D2D link is established secondly by the network between D2D terminal A and D2D terminal C and LID 3 is allocated to the D2D link on the basis of D2D terminal A. In addition, a D2D link is established fourthly by the network between D2D terminal A and D2D terminal B and LID 0 is allocated to the D2D link. Finally, a D2D link is established fifthly by the network between D2D terminal A and D2D terminal D and LID 4 is allocated to the D2D link.

The D2D LID included in the D2D BSR may be a physical LID allocated by the network. For example, when D2D terminal A attempts to transmit D2D BSRs for D2D terminals B, C and D, the D2D BSRs for D2D communication with D2D terminals B, C and D can be respectively identified by D2D LIDs "0", "3" and "4".

According to another embodiment of the present invention, a D2D terminal may control a logical LID reset based on a physical LID to be included in the MAC control element.

For example, D2D terminal A can arrange physical LIDs of neighboring D2D terminals in ascending order and then sequentially generate logical LIDs in ascending order of the physical LIDs. Since the physical LIDs of D2D terminals B, C and D around D2D terminal A are "0", "3" and "4", respectively, D2D terminal A can set the smallest physical LID "0" to logical LID "0", set the following physical LID "3" to logical LID "1" and set the last physical LID "4" to logical LID "2".

Conversely, D2D terminal A can arrange physical LIDs of neighboring D2D terminals in descending order and then sequentially generate logical LIDs in a descending order of the physical LIDs. In this case, D2D terminal A can set the largest physical LID "4" to logical LID "0", set the following physical LID "3" to logical LID "1" and set the last physical LID "0" to logical LID "2".

Alternatively, D2D terminal A may generate logical LIDs in the order of establishment of neighboring physical links. In this case, since physical links for D2D terminals B, C and D around D2D terminal A are respectively established fourthly, secondly and fifthly by the network, D2D terminal A can set logical LID "0" for D2D terminal C for which the D2D link is established first and set logical LID "1" for D2D terminal B for which the D2D link is established in the following order. Finally, D2D terminal A can set logical LID "1" for D2D terminal D for which the D2D link is established lastly.

Conversely, D2D terminal A may generate logical LIDs in reverse of order of establishment of neighboring physical links. In this case, logical LID "0" can be set for D2D terminal D, logical LID "1" can be set for D2D terminal B and logical LID "2" can be set for D2D terminal C.

When the transmitting D2D terminal intends to signal one or more D2D link buffer sizes, for example, when the transmitting D2D terminal attempts to transmit data to a plurality of receiving D2D terminals, the transmitting D2D terminal needs to transmit D2D BSRs for the respective receiving D2D terminals. When the MAC control element has a variable size, the transmitting D2D terminal may extend the size of the MAC control element and report the plurality of D2D link buffer sizes using a single MAC control element. To indicate whether the MAC control element size is extended, the MAC control element having a variable size may include an extended (E) bit.

When the MAC control element has a fixed size, the transmitting D2D terminal may configure a MAC PDU including a number of MAC control elements, which is larger than the number of buffer sizes to be signaled or the number of receiving D2D terminals that require D2D BSRs. This will now be described in detail with reference to FIG. 15.

Figure 15:
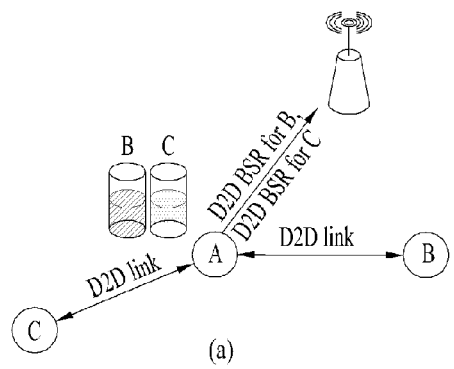
FIG. 15 illustrates transmission of a plurality of D2D BSRs.
Figure 15:
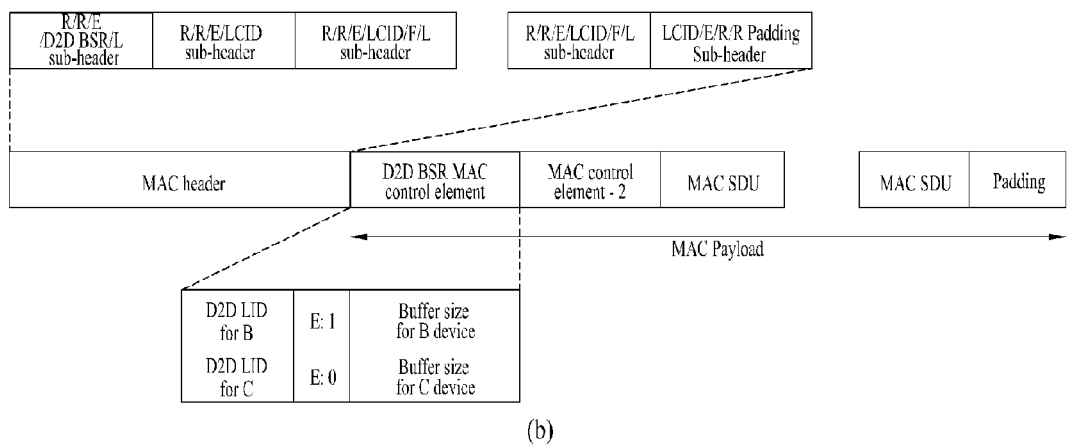
Figure 15:
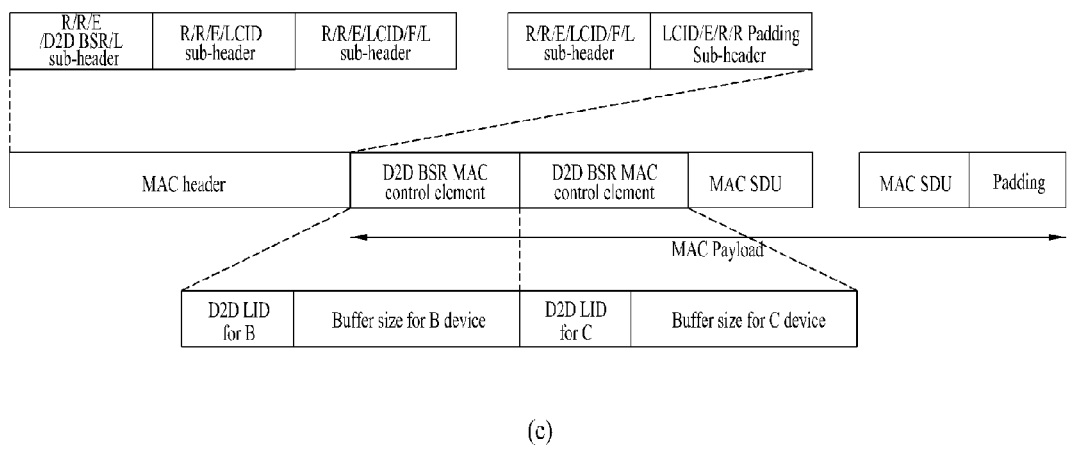

FIG. 15 illustrates transmission of a plurality of D2D BSRs.

It is assumed that D2D terminal A attempts to transmit D2D BSRs for D2D terminals B and C in the environment of FIG. 15a for convenience of description.

When a variable-size MAC control element is used, D2D terminal A may report buffer sizes for D2D terminals B and C using a single MAC control element. For example, when D2D terminal A wants to extend the size of the MAC control element, D2D terminal A can set the E bit to "1", as shown in FIG. 15b. When the E bit is "1", D2D LID/E/buffer size fields can be repeated once more in the MAC control element, as shown in FIG. 15b. D2D terminal A can control the LID, E bit and buffer size for D2D terminal B to be recorded in the MAC control element and control the LID, E bit and buffer size for D2D terminal C to be recorded in the extended region, as shown in FIG. 15b.

When the MAC control element size need not be extended, D2D terminal A can set the E bit to "0".

When the MAC control element has a fixed size, the MAC control element does not include the E bit. In this case, D2D terminal A may generate as many MAC control elements as the number of D2D BSRs to be reported. For example, D2D terminal A can report the buffer size for D2D terminal B through MAC control element 1 and report the buffer size for D2D terminal C through MAC control element 2, as shown in FIG. 15c. Accordingly, MAC control element 1 can include D2D LID and buffer size fields for D2D terminal B and MAC control element 2 can include D2D LID and buffer size fields for D2D terminal C.

Upon reception of the D2D BSR from the transmitting D2D terminal, the network may allocate radio resources for the D2D LID designated in the D2D BSR with reference to the buffer size. The transmitting D2D terminal may transmit data to the receiving D2D terminal using the radio resources allocated by the network.

When the transmitting D2D terminal has no more data to be transmitted to the receiving D2D terminal and thus the buffer of the transmitting D2D terminal is empty, the transmitting D2D terminal may transmit a D2D BSR indicating that the buffer size is 0 to the network. Then, the network may instruct the D2D terminal to perform one of the following procedures in order to efficiently manage connection to the D2D link indicated by the D2D BSR of the transmitting D2D terminal 1) Procedure of entering a D2D sleep mode (for example, DTX and DRX modes)

2) Procedure of releasing D2D connection (for example, entering a D2D idle state)

In the aforementioned example, the transmitting D2D terminal may transmit a D2D BSR in which the buffer size is set to 0 when the buffer of the transmitting D2D terminal is empty.

According to another embodiment of the present invention, when the buffer of the transmitting D2D terminal is empty, the transmitting D2D terminal may transmit a D2D empty buffer report (BR), which is discriminated from the aforementioned D2D BSR, to the network in order to notify the network that the buffer is empty. That is, when the buffer of the transmitting D2D terminal is empty, the transmitting D2D terminal may transmit the D2D empty BR instead of the D2D BSR.

In this case, the transmitting D2D terminal may record a field value indicating the D2D empty BR in an LCID of a sub-header corresponding to a MAC control element for the D2D empty BR. That is, the transmitting D2D terminal may define one of reserved indices as the D2D empty BR and then set the index defined as the D2D empty BR to the field value of the LCID. Table 4 shows an example of defining one of reserved indices as the D2D empty BR.

TABLE 4

| LCID values including D2D empty BR | |
|---|---|
| Index | LCID value |
| 00000 | CCCH |
| 00001-01010 | Identity of the logical channel |
| 01011-10111 | Reserved |
| 11000 | D2D empty BR |
| 11001 | D2D BSR |
| 11010 | Power Headroom Report |
| 11011 | C-RNTI |
| 11100 | Truncated BSR |
| 11101 | Short BSR |
| 11110 | Long BSR |
| 11111 | Padding |

In the example of Table 4, the transmitting D2D terminal may record "11001" in the LCID in order to transmit the D2D BSR when the transmitting D2D terminal has data to be provided to the receiving D2D terminal and record "11000" in the LCID in order to transmit the D2D empty BR when the transmitting D2D terminal has no more data to be provided to the receiving D2D terminal When D2D empty buffer reporting is performed, the buffer size of the transmitting D2D terminal is 0 all the time and thus the MAC control element can be simply configured compared to the D2D BSR. This will now be described in detail with reference to FIGS. 16 and 17.

Figure 16:

FIGS. 16 and 17 illustrate MAC control element formats for the D2D empty BR. FIG. 16 shows a MAC control element having a variable size and FIG. 17 shows a MAC control element having a fixed size.

The MAC control element for the D2D empty BR may not include the buffer size field, distinguished from the MAC control element for the D2D BSR, shown in FIGS. 12 and 13, since the D2D empty BR is used to report the empty buffer state of the transmitting D2D terminal. Accordingly, as shown in FIGS. 16 and 17, the MAC control element for the D2D empty BR may include the D2D LID field and E field or include only the D2D LID field.

When the transmitting D2D terminal wants to signal one or more empty buffers of D2D links, the transmitting D2D terminal may change the size of the MAC control element or increase the number of MAC control elements and transmit a plurality of D2D empty BRs, as illustrated in FIG. 15. For example, when the MAC control element has a variable size, the transmitting D2D terminal may extend the size of the MAC control element using the E bit such that a plurality of D2D LID fields and E fields are included in one MAC control element. On the other hand, when the MAC control element has a fixed size, the transmitting D2D terminal may configure an NMAC PDU including a number MAC control elements, which is larger than the number of D2D empty BRs to be transmitted. This will now be described in detail with reference to FIG. 18.

Figure 18:
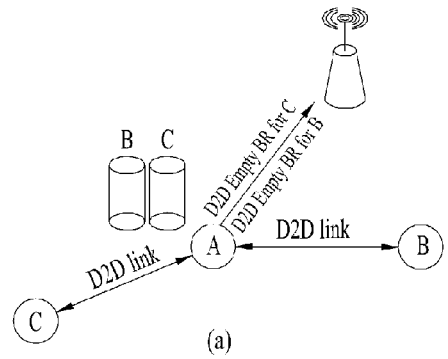
FIG. 18 illustrates a MAC control element for a plurality of D2D empty BRs.
Figure 18:
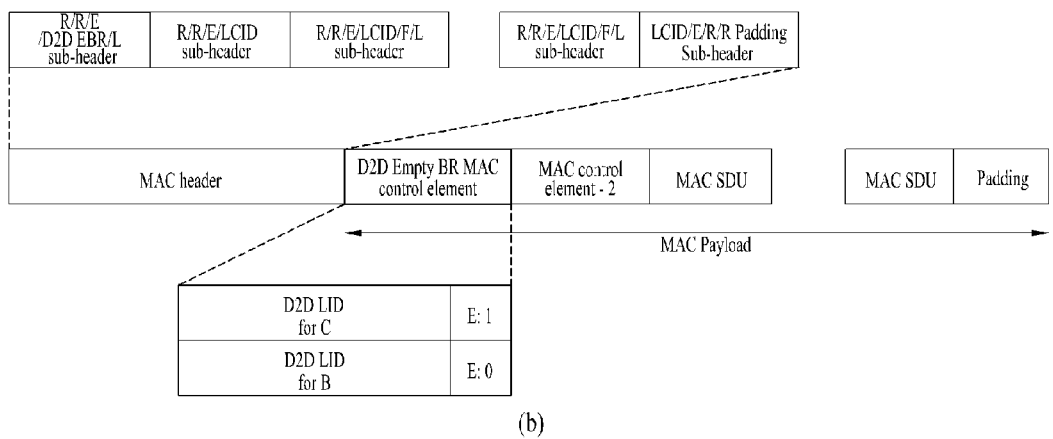
Figure 18:
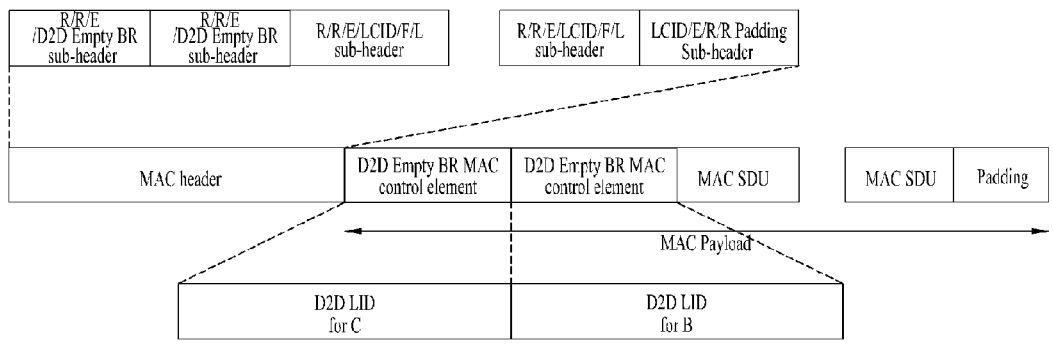

FIG. 18 illustrates a MAC control element for a plurality of D2D empty BRs.

For convenience of description, it is assumed that D2D terminal A attempts to transmit D2D empty BRs for D2D terminals B and C in the environment of FIG. 18a.

When the MAC control element having a variable size is used, D2D terminal A may report empty buffers statuses for D2D terminals B and C using a single MAC control element. For example, when D2D terminal A wants to extend the size of the MAC control element, the E bit can be set to "1", as shown in FIG. 18b. When the E bit is "1", the D2D LID and E fields can be repeated once more in the MAC control element, as shown in FIG. 18b. D2D terminal A may configure the MAC control element including the LID and E bit for D2D terminal C in the extended region in addition to the LID and E bit for D2D terminal B, as shown in FIG. 18b.

When the MAC control element need not be extended, D2D terminal A can set the E bit to "0".

When the MAC control element has a fixed size, the MAC control element does not include the E bit. In this case, D2D terminal A may configure a MAC PDU including a number of MAC control elements, which is larger than the number of D2D empty BRs to be transmitted. For example, D2D terminal A may control the D2D LID for D2D terminal B to be included in MAC control element 1 and control the D2D LID for D2D terminal C to be included in D2D MAC control element 2, as shown in FIG. 18c.

<Buffer Status Reporting Method in Distributed D2D Communication>

In distributed D2D communication, when the transmitting D2D terminal has data in the buffer thereof, the transmitting D2D terminal occupies a traffic slot through competition with other D2D links and thus the transmitting D2D terminal need not notify the receiving D2D terminal or the network of the quantity of resources necessary therefor. However, when the transmitting D2D terminal has no more data to be transmitted, the transmitting D2D terminal may notify the receiving D2D terminal or the network that data with respect to corresponding D2D connection is not present for a predetermined time or not present any more, thereby aiding in efficient D2D connection management.

Accordingly, when the buffer of the transmitting D2D terminal is empty, the transmitting D2D terminal may transmit the D2D empty BR to the network so as to notify the network that the buffer thereof is empty.

In this case, the transmitting D2D terminal may set an index indicating the D2D empty BR as the LCID field value of the sub-header in order to indicate whether the D2D empty BR is for data transmission between the transmitting D2D terminal and the network or data transmission between the transmitting D2D terminal and the receiving D2D terminal That is, one of reserved indices can be defined as the D2D empty BR and then the defined index can be set as the LCID field value. Table 5 shows an example of defining one of reserved indices as the D2D empty BR.

TABLE 5

| \multicolumn{2}{c}{LCID values including D2D empty BR} ||
|---|---|
| Index | LCID value |
| 00000 | CCCH |
| 00001-01010 | Identity of the logical channel |
| 01011-10111 | Reserved |
| 11001 | D2D empty BR |
| 11010 | Power Headroom Report |
| 11011 | C-RNTI |
| 11100 | Truncated BSR |
| 11101 | Short BSR |
| 11110 | Long BSR |
| 11111 | Padding |

When the transmitting D2D terminal has no more data to be transmitted to the receiving D2D terminal, the transmitting D2D terminal may set index "11001" as the LCID field value in order to perform D2D empty buffer reporting.

In transmission of the D2D empty BR, the network needs to specify which D2D terminals are related to the D2D empty BR in D2D communication. Accordingly, when the transmitting D2D terminal configures the MAC control element for the D2D empty BR, the transmitting D2D terminal may control a D2D LID with respect to the transmitting D2D terminal and the receiving D2D terminal to be included in the MAC control element. The D2D LID can be one of a physical LID and a logical LID, as described above in network centralized D2D communication and thus detailed description thereof is omitted.

The MAC PDU structure for the D2D empty BR and the MAC PDU structure for a plurality of D2D empty BRs are the same as described above with reference to FIGS. 16, 17 and 18 and thus detailed description thereof is omitted.

Upon reception of the D2D empty BR from the transmitting D2D terminal, the network may instruct the D2D terminal to perform one of the following procedures in order to efficiently manage connection to the D2D link indicated by the D2D empty BR.

1) Procedure of entering the D2D sleep mode (for example, DTX and DRX modes)

2) Procedure of releasing D2D connection (for example, entering the D2D idle state)

<Buffer Status Reporting Method in Autonomous D2D Communication>

When the transmitting D2D terminal has data stored in the buffer thereof in autonomous D2D communication, the transmitting D2D need not notify the receiving D2D terminal or the network of the quantity of necessary resources since the transmitting D2D terminal occupies a traffic slot through competition with other D2D links. When a D2D traffic slot is occupied through competition with other D2D links, the receiving D2D terminal needs to continuously monitor D2D traffic resources acquired for the corresponding D2D link until the region of the acquired D2D traffic resources is ended to receive data from the transmitting D2D terminal When the quantity of data remaining in the buffer of the transmitting D2D terminal is very small compared to an acquired D2D traffic interval, the receiving D2D terminal has to attempt to continuously monitor and decode the remaining D2D traffic resource region even though the receiving D2D terminal has no more data to receive after reception of data that should be received thereby. This may reduce power efficiency of the receiving D2D terminal in the case of a long D2D traffic interval.

Accordingly, when the transmitting D2D terminal transmits last data using D2D traffic resources, the transmitting D2D terminal may transmit, to the receiving D2D terminal, a D2D last data report indicating that data transmission is due to complete or transmit a D2D empty BR indicating that data transmission has been ended after transmitting the last data.

Figure 19:
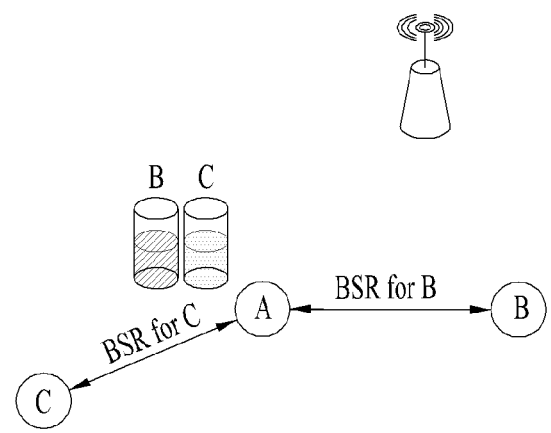
FIG. 19 illustrates a case in which one D2D terminal is linked with a plurality of D2D terminals in autonomous D2D communication.

The D2D last data report and the D2D empty BR in autonomous D2D communication can be directly transmitted to the receiving D2D terminal instead of the network, distinguished from the aforementioned network coordinated D2D communication. Accordingly, the D2D last data report and D2D empty BR need not include the D2D LID for specifying the transmitting D2D terminal and the receiving D2D terminal, differently from the D2D BSR and D2D empty BR in network coordinated D2D communication. Furthermore, since the transmitting D2D terminal directly transmits the D2D last data report or D2D empty BR to the receiving D2D terminal, it is not necessary to extend the MAC control element using the E field. For example, when D2D terminal A attempts to transmit D2D last data reports or D2D empty BRs for D2D terminals B and C, as shown in FIG. 19, D2D terminal A can transmit the D2D last data report or D2D empty BR for D2D terminal B to D2D terminal B and transmit the D2D last data report or D2D empty BR for D2D terminal C to D2D terminal C. Accordingly, it is not necessary to identify the D2D terminal that needs to receive data and to extend the MAC control element when D2D last data reports or D2D empty BRs are transmitted to a plurality of D2D terminals.

Therefore, the fields of the MAC control element, shown in FIGS. 16 and 17, can be omitted in autonomous D2D communication.

Consequently, the transmitting D2D terminal can transmit the D2D last data report or D2D empty BR using only the sub-header without the MAC control element, distinguished from network coordinated D2D communication, according to an embodiment of the present invention. That is, the transmitting D2D terminal can configure a MAC PDU including sub-headers for the D2D last data report and D2D empty BR and then transmit the MAC PDU to the receiving D2D terminal. This will now be described in detail with reference to FIG. 20.

Figure 20:
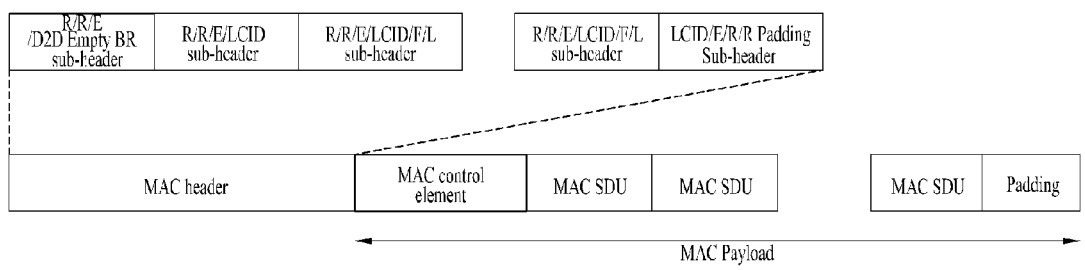
FIG. 20 illustrates a MAC PDU for performing D2D last data report or D2D empty BR using sub-headers.

FIG. 20 illustrates a MAC PDU for transmitting the D2D final data report or D2D empty BR using a sub-header. To transmit the D2D last data report or D2D empty BR, the transmitting D2D terminal may set an index, which indicates the D2D last data report or D2D empty BR, in the LCID of the sub-header. That is, transmitting D2D terminal can define one of reserved indices as the index indicating the D2D last data report or D2D empty BR and then set the defined index as the LCID field value. Table 6 shows an example of defining one of reserved LCID values as the D2D last data report or D2D empty BR.

TABLE 6

LCID values including D2D last data report or D2D empty BR

| Index | LCID value |
|---|---|
| 00000 | CCCH |
| 00001-01010 | Identity of the logical channel |
| 01011-11000 | Reserved |
| 11001 | D2D last data Report (or D2D empty BR) |
| 11010 | Power Headroom Report |
| 11011 | C-RNTI |
| 11100 | Truncated BSR |
| 11101 | Short BSR |
| 11110 | Long BSR |
| 11111 | Padding |

In the example of Table 6, when the LCID value of the sub-header is "11001", the receiving D2D terminal can recognize that data transmitted from the transmitting D2D terminal is last data or data transmission is ended.

Accordingly, the receiving D2D terminal can terminate monitoring of the traffic slot allocated thereto. This will now be described in more detail with reference to FIG. 20.

Figure 21:
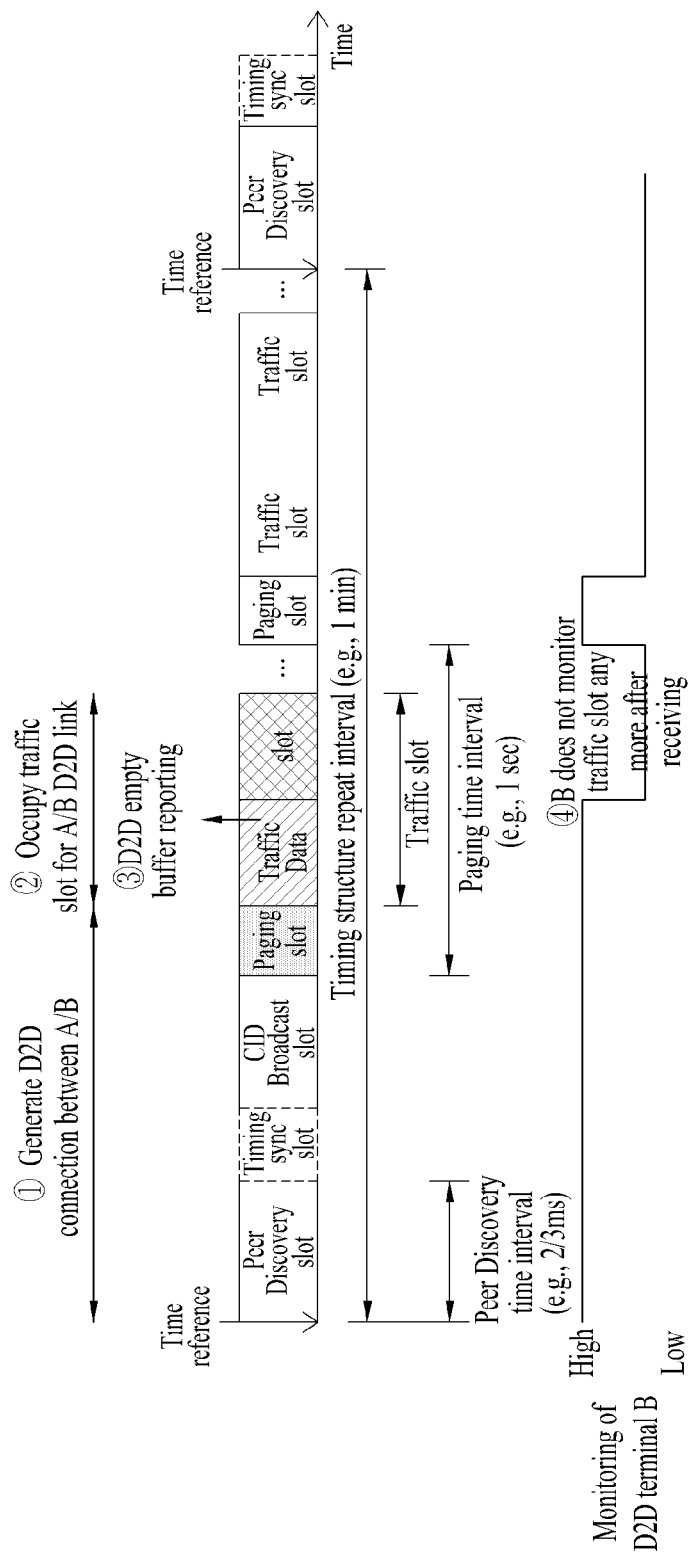
FIG. 21 illustrates operation of a receiving D2D terminal receiving D2D final data report or D2D empty BR.

FIG. 21 illustrates an operation of the receiving D2D terminal receiving the D2D last data report of D2D empty BR. For convenience of description, the transmitting D2D terminal is referred to as D2D terminal A and the receiving D2D terminal is referred to as D2D terminal B in the example shown in FIG. 21.

When D2D connection is made between the D2D terminal A and D2D terminal B through a peer discovery slot and a paging slot, D2D terminals A and B may attempt to occupy a traffic slot. When the traffic slot has been successfully occupied, D2D terminal A may transmit data through the occupied traffic slot and D2D terminal B may monitor the traffic slot and receive the data. When the D2D last data report or D2D empty BR is transmitted from D2D terminal A during data reception using the traffic slot, D2D terminal B may stop monitoring of the remaining traffic slot and terminate data reception.

Subsequently, D2D terminal B may monitor user scheduling intervals of the next paging slot, peer discovery slot and traffic slot so as to check whether data to be transmitted thereto is present.

The above-described embodiments correspond to combinations of elements and features of the present invention in prescribed forms. In addition, the respective elements or features may be considered selective unless explicitly mentioned otherwise. Each of the elements or features can be implemented in a form failing to be combined with other elements or features. Moreover, it is possible to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for reporting a buffer status in D2D communication and the apparatus therefor are industrially applicable to various communication systems such as 3GPP LTE, LTE-A and IEEE 802.

The invention claimed is:

1. A method for reporting a buffer status in a radio communication system supporting device-to-device (D2D) communication, the method comprising:
configuring, by a first D2D terminal, a media access control (MAC) packet data unit (PDU) including an identifier (ID) of a D2D link with a second D2D terminal, for D2D buffer status reporting (BSR) to a base station, before the first D2D terminal transmits data to the second D2D terminal; and
transmitting, by the first D2D terminal, the MAC PDU from the first D2D terminal to the base station; and
receiving, by the first D2D terminal, instruction from the base station to perform at least one of entering a D2D sleep mode or releasing connection with the second D2D terminal, when the MAC PDU indicates a buffer size of the first D2D terminal is "0",
wherein the ID of the D2D link serves to distinguish the D2D link between the first D2D terminal and the second D2D terminal from other D2D links.

2. The method according to claim 1, wherein the MAC PDU includes i) MAC control elements including a buffer size indicating the quantity of data to be transmitted to the second D2D terminal and the D2D link ID and ii) sub-headers corresponding to the MAC control elements.

3. The method according to claim 2, wherein the sub-headers include a logical channel identification field (LCID), and the first D2D terminal sets an index, indicating the D2D BSR for D2D communication, as a field value of the LCID.

4. The method according to claim 2, wherein the first D2D terminal controls the MAC control element of which the buffer size is set to "0" to be included in the MAC PDU when the buffer of the first D2D terminal is empty.

5. A method for reporting a buffer status in a radio communication system supporting device-to-device (D2D) communication, the method comprising:
configuring, by a first D2D terminal, a media access control (MAC) packet data unit (PDU) including an identifier (ID) of a D2D link with a second D2D terminal, for a D2D empty buffer report (BR) to the base station for indicating an empty buffer status, when the first D2D terminal has no more data to be transmitted to the second D2D terminal;
transmitting, by the first D2D terminal, the MAC PDU from the first D2D terminal to a network a base station; and
receiving, by the first D2D terminal, instruction from the base station to perform at least one entering a D2D sleep mode or releasing connection with the second D2D terminal, upon transmission of the MAC PDU for the D2D empty BR,
wherein the ID of the D2D link serves to distinguish the D2D link between the first D2D terminal and the second D2D terminal from other D2D links.

6. The method according to claim 5, wherein the MAC PDU for the D2D empty BR includes i) MAC control elements including the D2D link ID and ii) sub-headers corresponding to the MAC control elements.

7. A method for reporting a buffer status in a radio communication system supporting device-to-device (D2D) communication, the method comprising:
configuring, by a first D2D terminal, a media access control (MAC) packet data unit (PDU) for performing a D2D last data report indicating transmission of last data to a base station when the first D2D terminal transmits last data using radio resources allocated to a D2D link with a second D2D terminal, or configuring a MAC PDU for a D2D empty buffer report (BR) to the base station for indicating an empty buffer status of the first D2D terminal when the first D2D terminal has no more data to be transmitted through the radio resources, when data is transmitted from the first D2D terminal using the radio resources allocated to the D2D link;
transmitting, by the first D2D terminal, the MAC PDU to the base station; and
receiving, by the first D2D terminal, instruction from the base station to perform at least one entering a D2D sleep mode or releasing connection with the second D2D terminal, upon transmission of the MAC PDU for the D2D empty BR.

8. The method according to claim 7, wherein the first D2D terminal reports the D2D last data report or the D2D empty BR through a sub-header of the MAC PDU.

9. The method according to claim 8, wherein the sub-header includes a logical channel identification field (LCID), and the first D2D terminal sets an index, indicating the D2D last data report or the D2D empty BR, as a field value of the LCID.

10. A device-to-device (D2D) terminal transmitting a buffer status report (BSR) in a radio communication system supporting D2D communication, the D2D terminal comprising:
a processor configured to configure media access control (MAC) packet data unit (PDU) including an identifier (ID) of a D2D link with a first D2D terminal, for D2D buffer status reporting to a base station, before the D2D terminal transmits data to the first D2D terminal; and
a transmitter configured to transmit the MAC PDU to the base station
wherein the processor receives instruction from the network to perform at least one of entering a D2D sleep mode or releasing connection with the first D2D terminal, when the MAC PDU indicates a buffer size of the first D2D terminal is "0", and
wherein the ID of the D2D link serves to distinguish the D2D link between the D2D terminal and the first D2D terminal from other D2D links.

11. A device-to-device (D2D) terminal transmitting a BSR in a radio communication system supporting D2D communication, comprising:
a processor configured to configure a media access control (MAC) packet data unit (PDU) including an identifier (ID) of a D2D link with a first D2D terminal, for a D2D empty buffer report (BR) to a base station for indicating an empty buffer status, when there is no more data to be transmitted to the first D2D terminal; and
a transmitter configured to transmit the MAC PDU to the base station,
wherein the processor receives instruction from the base station to perform at least one entering a D2D sleep mode or releasing connection with the first D2D terminal, upon transmission of the MAC PDU for the D2D empty BR, and wherein the ID of the D2D link serves to distinguish the D2D link between the D2D terminal and the first D2D terminal from other D2D links.

12. A device-to-device (D2D) terminal transmitting a BSR in a radio communication system supporting D2D communication, comprising:

a processor configured to configure a media access control (MAC) packet data unit (PDU) for performing a D2D last data report indicating transmission of last data to a base station when the last data is transmitted using radio resources allocated to a D2D link with a first D2D terminal, or to configure a MAC PDU for a D2D empty buffer report (BR) to the base station for indicating an empty buffer status when there is no more data to be transmitted through the radio resources, when data is transmitted using the radio resources allocated to the D2D link; and a transmitter configured to transmit the MAC PDU to the base station, wherein the processor receives instruction from the base station to perform at least one entering a D2D sleep mode or releasing connection with the first D2D terminal, upon transmission of the MAC PDU for the D2D empty BR.

* * * * *